(12) United States Patent
Takahashi et al.

(10) Patent No.: US 11,192,590 B2
(45) Date of Patent: Dec. 7, 2021

(54) VEHICLE LOWER SECTION STRUCTURE

(71) Applicant: Toyota Jidosha Kabushiki Kaisha, Toyota (JP)

(72) Inventors: Naoki Takahashi, Miyoshi (JP); Shin Inoue, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 16/574,965

(22) Filed: Sep. 18, 2019

(65) Prior Publication Data
US 2020/0114973 A1    Apr. 16, 2020

(30) Foreign Application Priority Data
Oct. 12, 2018    (JP) .............................. JP2018-193373

(51) Int. Cl.
| | | |
|---|---|---|
| *B62D 25/02* | (2006.01) | |
| *B62D 25/20* | (2006.01) | |
| *B62D 25/04* | (2006.01) | |
| *B60R 16/03* | (2006.01) | |
| *B60K 1/04* | (2019.01) | |

(52) U.S. Cl.
CPC ........... *B62D 25/025* (2013.01); *B62D 25/04* (2013.01); *B62D 25/2036* (2013.01); *B60K 1/04* (2013.01); *B60K 2001/0438* (2013.01); *B60R 16/03* (2013.01)

(58) Field of Classification Search
CPC .. B62D 25/025; B62D 25/04; B62D 25/2036; B60R 16/03; B60K 1/04; B60K 2001/0438
See application file for complete search history.

(56) References Cited

U.S. PATENT DOCUMENTS

| | | | |
|---|---|---|---|
| 9,027,684 B2 * | 5/2015 | Araki ....................... | B60K 1/04 180/68.5 |
| 2010/0237659 A1 | 9/2010 | Ishigame et al. | |
| 2018/0237075 A1 | 8/2018 | Kawabe et al. | |

FOREIGN PATENT DOCUMENTS

| | | |
|---|---|---|
| JP | 2000108948 A | 4/2000 |
| JP | 2010228642 A | 10/2010 |
| JP | 2011-143761 A | 7/2011 |
| JP | 2017087806 A | 5/2017 |
| JP | 2017196959 A | 11/2017 |
| KR | 970001051 A | 1/1997 |
| KR | 19980055154 A | 9/1998 |

* cited by examiner

*Primary Examiner* — D Glenn Dayoan
*Assistant Examiner* — Melissa Ann Bonifazi
(74) *Attorney, Agent, or Firm* — Dinsmore & Shohl LLP (57) ABSTRACT

A battery case is joined to a rocker inner formed toward a vehicle width direction inner side of a rocker. The rocker is provided with rocker outer R/F and rocker inner R/F that respectively form a closed cross-section portion and a closed cross-section portion between themselves and a rocker panel that partitions a closed cross-section portion formed by a rocker outer and the rocker inner in the vehicle width direction.

20 Claims, 3 Drawing Sheets

VEHICLE LOWER SECTION STRUCTURE

CROSS-REFERENCE TO RELATED APPLICATION

This application is based on and claims priority under 35 USC 119 from Japanese Patent Application No. 2018-193373 filed on Oct. 12, 2018, the disclosure of which is incorporated by reference herein.

BACKGROUND

Technical Field

The present disclosure relates to a vehicle lower section structure.

Related Art

For example, Japanese Patent Application Laid-Open (JP-A) No. 2000-108948 discloses technology relating to a floor panel provided with a pair of side sills (referred to hereafter as "rockers") extending in a vehicle front-rear direction on both vehicle width direction sides. Frames are installed running parallel to the rockers at the vehicle width direction inner sides of the pair of rockers. In this technology, bolts are used to fasten a battery box (referred to hereafter as a "battery case") to the frame from the vehicle vertical direction lower side. As another example, JP-A No. 2017-196959 discloses technology in which bolts are used to fasten a battery case to a lower wall of a rocker.

In order to suppress ingress of vehicle framework members or the like into a vehicle cabin in a collision to a side face of a vehicle (referred to hereafter as "side-on collision of the vehicle"), rockers are generally set with high rigidity and strength. For example, JP-A No. 2017-087806 discloses technology in which a rocker is configured by a rocker inner panel configuring a vehicle width direction inner side of the rocker and a rocker outer panel configuring a vehicle width direction outer side of the rocker, and a closed cross-section portion is formed between the rocker inner panel and the rocker outer panel. In this technology, a dividing wall partitioning the closed cross-section portion of the rocker along the vehicle width direction and a dividing wall partitioning the closed cross-section portion of the rocker along the vehicle vertical direction are each joined to both the rocker inner panel and the rocker outer panel. As another example, JP-A No. 2010-228642 also discloses technology relating to a rocker, although it does not relate to an electric vehicle.

However, in the technology disclosed in JP-A No. 2000-108948, the battery case is fastened to the frame that is provided further toward the vehicle width direction inner side than the rockers. Consequently, although impact to the battery case is reduced in a side-on collision of the vehicle, there is a commensurate reduction in the size of the battery case, resulting in a smaller space in which to house the battery.

On the other hand, in the technology disclosed in JP-A Nos. 2017-196959 and 2017-087806, the battery case is fastened to a lower wall of a rocker. This allows a commensurate increase in the size of the battery case in comparison to the technology disclosed in JP-A No. 2000-108948, but potential impact to the battery case in a vehicle side-on collision is a concern. Note that the technology disclosed in JP-A No. 2010-228642 does not relate to a configuration in which a battery case is mounted to a lower section of a vehicle.

SUMMARY

The present disclosure obtains a vehicle lower section structure capable of lessening shock input to a battery case in a side-on collision of a vehicle and also capable of securing sufficient space in which to house a battery.

A vehicle lower section structure according to a first aspect includes a pair of rockers that are respectively installed at opposing outer sides, in a vehicle width direction, of a floor panel of a vehicle, and that each extend in a vehicle front-rear direction, and a battery case that is disposed between the pair of rockers at a lower side, in a vehicle vertical direction of the floor panel. Each of the rockers includes a rocker outer panel configuring a vehicle width direction outer side of the rocker, a rocker inner panel configuring a vehicle width direction inner side of the rocker, forming a first closed cross-section portion with the rocker outer panel, and joined to the battery case, a rocker panel joined to the rocker outer panel and the rocker inner panel so as to partition the first closed cross-section portion between a second closed cross-section portion positioned toward the vehicle width direction outer side of the rocker and a third closed cross-section portion positioned toward the vehicle width direction inner side of the rocker, a rocker outer reinforcement disposed within the second closed cross-section portion to form a fourth closed cross-section portion between the rocker outer reinforcement and the rocker panel, and a rocker inner reinforcement disposed within the third closed cross-section portion to form a fifth closed cross-section portion between the rocker inner reinforcement and the rocker panel, and joined to the rocker outer reinforcement.

In the vehicle lower section structure according to the first aspect, the pair of rockers respectively installed at opposing outer sides, in a vehicle width direction, of the floor panel of the vehicle, each extend along the vehicle front-rear direction. The battery case is disposed between the pair of rockers at the lower side, in the vehicle direction, of the floor panel.

Each of the rockers includes the rocker outer panel and the rocker inner panel. The rocker outer panel configures the vehicle width direction outer side of the rocker, and the rocker inner panel configures the vehicle width direction inner side of the rocker. The first closed cross-section portion is formed by the rocker outer panel and the rocker inner panel, and the battery case is joined to the rocker inner panel.

Each of the rockers further includes the rocker panel, the rocker outer reinforcement, and the rocker inner reinforcement. The rocker panel is joined to the rocker outer panel and the rocker inner panel, and the rocker panel partitions the first closed cross-section portion of the rocker between the second closed cross-section portion positioned toward the vehicle width direction outer side of the rocker and the third closed cross-section portion positioned toward the vehicle width direction inner side of the rocker.

The rocker outer reinforcement is disposed within the second closed cross-section portion, and the rocker outer reinforcement forms the fourth closed cross-section portion between itself and the rocker panel. The rocker inner reinforcement is disposed within the third closed cross-section portion, and the rocker inner reinforcement forms the fifth closed cross-section portion between itself and the rocker panel, and is joined to the rocker outer reinforcement.

As described above, in the present disclosure the battery case is joined to the rocker inner panel forming the vehicle width direction inner side of the rocker. This enables the battery case to be made larger in the vehicle width direction than, for example, in cases in which the battery case is joined so as to be separated toward the vehicle width direction inner side from each of the rockers.

Moreover, in the present disclosure, each of the rockers is provided with the rocker panel that partitions the first closed cross-section portion formed by the rocker outer panel and the rocker inner panel in the vehicle width direction. The rocker panel is braced in the vehicle vertical direction within the rocker, thereby acting as a member with what is referred to as a bracing function. The rocker panel of the present disclosure therefore suppresses vehicle vertical direction crushing (what is referred to as cross-sectional collapse) of the rocker.

Each of the rockers is further provided with the rocker outer reinforcement and the rocker inner reinforcement that respectively form the fourth closed cross-section portion and the fifth closed cross-section portion between themselves and the rocker panel, thereby enabling the rigidity of the rocker to be raised. The present disclosure thus enables shock input to the battery case that is joined to the rocker inner panel to be lessened in a side-on collision of the vehicle.

A vehicle lower section structure according to a second aspect is the vehicle lower section structure according to the first aspect, wherein each of the rockers is further provided with an upper reinforcement, within the second closed cross-section portion and further toward a vehicle vertical direction upper side than the rocker outer reinforcement so as to form a sixth closed cross-section portion between the rocker outer reinforcement and the rocker panel.

In the vehicle lower section structure according to the second aspect, each of the rockers is further provided with the upper reinforcement, within the second closed cross-section portion and further toward the vehicle vertical direction upper side than the rocker outer reinforcement. The upper reinforcement forms the sixth closed cross-section portion between the rocker outer reinforcement and the rocker panel. The present disclosure is thus capable of further raising the rigidity of the rockers on the rocker outer panel side, and is capable of further lessening shock input to the battery case that is joined to the rocker inner panel in a side-on collision of the vehicle.

A vehicle lower section structure according to a third aspect is the vehicle lower section structure according to the first aspect, further including a pillar that extends from each of the rockers toward a vehicle vertical direction upper side. A pillar inner member configured to be a vehicle width direction inner side of each of the pillars is joined to the corresponding rocker panel.

The vehicle lower section structure according to the third aspect includes the pillars extending from each of the rockers toward the vehicle vertical direction upper side. The pillar inner member configuring the vehicle width direction inner side of each of the pillars is joined to the corresponding rocker panel. Accordingly, in the present disclosure, the vehicle vertical direction rigidity of the pillar is raised, enabling crushing of a ceiling of the vehicle in a vehicle rollover accident, namely what is referred to as roof crush, to be suppressed.

A vehicle lower section structure according to a fourth aspect is the vehicle lower section structure according to the third aspect, wherein each of the pillars is a center pillar, each provided at a vehicle front-rear direction central portion of the corresponding rocker. Each of the rocker inner panels includes a first vertical wall formed along the vehicle vertical direction and the vehicle front-rear direction, and a vehicle vertical direction lower end portion of the pillar inner member of each of the center pillars is joined to the corresponding first vertical wall in the vehicle width direction.

In the vehicle lower section structure according to the fourth aspect, each of the pillar is center pillar, each provided at the vehicle front-rear direction central portion of the corresponding rocker. The rocker inner panels are each configured including the first vertical wall formed along the vehicle vertical direction and the vehicle front-rear direction. The vehicle vertical direction lower end portion of the pillar inner member configuring the vehicle width direction inner side of each of the center pillars is joined to the corresponding first vertical wall in the vehicle width direction.

Accordingly, in the present disclosure, out of plural pillars provided to side sections of the vehicle, the vehicle vertical direction rigidity of the center pillars in particular is raised, enabling roof crush to be effectively suppressed by the center pillars.

A vehicle lower section structure according to a fifth aspect is the vehicle lower section structure according to the fourth aspect, wherein a vehicle vertical direction upper end portion of each of the rocker panels is joined to the corresponding first vertical wall in the vehicle width direction.

As described above, the first vertical wall of each of the rocker inner panels is joined to the pillar inner member of the corresponding center pillar. The rocker panel acts as a member with a bracing function braced in the vehicle vertical direction within the rocker, thereby suppressing vehicle vertical direction crushing of the rocker.

Accordingly, in the vehicle lower section structure according to the fifth aspect, joining the vehicle vertical direction upper end portion of the rocker panel to the first vertical wall in the vehicle width direction enables roof crush to be suppressed by the rocker panel.

A vehicle lower section structure according to a sixth aspect is the vehicle lower section structure according to the fourth aspect, wherein each of the rocker inner panels is configured further including a second vertical wall provided further toward the vehicle width direction inner side than the first vertical wall so as to oppose the battery case, and a refuge portion formed between the second vertical wall and the first vertical wall so as to be recessed toward the vehicle width direction outer side.

In the vehicle lower section structure according to the sixth aspect, each of the rocker inner panels further comprise the second vertical wall and the refuge portion. The second vertical wall is provided further toward a vehicle width direction inner side than the first vertical wall so as to oppose the battery case, and the refuge portion is provided between the second vertical wall and the first vertical wall and is formed so as to be recessed toward a vehicle width direction outer side.

Namely, in the present disclosure, providing the refuge portion to the rocker inner panel enables a refuge space through which components can be routed to be formed between the rocker inner panel and the battery case. This enables wiring to electrically connect battery modules housed in the battery case to be routed through the refuge portion.

A vehicle lower section structure according to a seventh aspect is the vehicle lower section structure according to a fourth aspect when dependent from the second aspect, wherein a floor cross member is installed along the vehicle width direction above the floor panel of the vehicle, and a vehicle width direction end portion of the floor cross member is joined to the corresponding first vertical wall, and a vehicle width direction inner end portion of the upper reinforcement is also joined to the first vertical wall.

In the vehicle lower section structure according to the seventh aspect, the floor cross member is installed along the vehicle width direction above the floor panel of the vehicle. The vehicle width direction end portion of the floor cross member is joined to the corresponding first vertical wall, and the vehicle width direction inner end portion of the upper reinforcement is also joined to the first vertical wall. Accordingly, in the present disclosure, the upper reinforcement and the floor cross member are provided so as to run continuously along the vehicle width direction through the first vertical wall of the rocker inner panel.

Accordingly, in the present disclosure, in a side-on collision of the vehicle, side collision load input to one of the rockers is transmitted to the opposite rocker through the upper reinforcement and the floor cross member. Namely, in the present disclosure, the side collision load is dispersed through the floor cross member, enabling a reduction in the side collision load that is input to the floor panel.

A vehicle lower section structure according to an eighth aspect is the vehicle lower section structure according to the sixth aspect, wherein wiring is routed through the refuge portion.

In the vehicle lower section structure according to the eighth aspect, the wiring is routed through the refuge portion formed in the rocker. There is therefore no need to secure a space to route wiring within the battery case, enabling maximum utilization of the space within the battery case. The present disclosure thus enables the size of the battery case to be increased.

A vehicle lower section structure according to a ninth aspect is the vehicle lower section structure according to the sixth aspect, wherein a join portion, to which a vehicle width direction end portion of the floor panel is joined, is provided between the first vertical wall and the refuge portion.

In the vehicle lower section structure according to the ninth aspect, the join portion, to which the vehicle width direction end portion of the floor panel is joined, is provided between the first vertical wall and the refuge portion. Namely, the join portion of the floor panel is provided further toward the vehicle width direction inner side than the first vertical wall of the corresponding rocker. In the present disclosure, the floor panel can be configured with a shorter vehicle width direction dimension than in cases in which the join portion of the floor panel is provided to the first vertical wall of the rocker, thereby enabling a commensurate reduction in costs.

A vehicle lower section structure according to a tenth aspect is the vehicle lower section structure according to the ninth aspect, wherein a seal is provided at a corner formed between the floor panel and the refuge portion.

In the vehicle lower section structure according to the tenth aspect, the seal is provided at the corner formed between the floor panel and the refuge portion. Namely, in the present disclosure, a water-resistant function is obtained by providing the seal at the corner positioned on the vehicle outer side at a join portion between the floor panel and the rocker.

A vehicle lower section structure according to an eleventh aspect is the vehicle lower section structure according to the tenth aspect, wherein a vehicle width direction dimension of the refuge portion is shorter than a vehicle vertical direction height dimension of the refuge portion.

As described above, the seal provided to the corner formed between the floor panel and the refuge portion is formed by coating with a sealing member. A tool is needed to coat the sealing member onto the corner. This tool enters the refuge portion from the lower side of the corner.

Accordingly, in the vehicle lower section structure according to the eleventh aspect, the vehicle width direction dimension of the refuge portion is shorter than the vehicle vertical direction height dimension of the refuge portion, such that the angle of entry of the tool is smaller than 45°. If the angle of entry of the tool becomes large, the tool is inserted into the refuge portion in a state commensurately closer to horizontal, requiring a wider operation space to be secured.

However, in the present disclosure, the angle of entry of the tool can be smaller than 45°, such that the seal is provided to the corner formed between the floor panel and the refuge portion in a state in which the tool is as close as possible to vertical. An operation to provide the seal to the corner can accordingly be performed even with limited space.

A vehicle lower section structure according to a twelfth aspect is the vehicle lower section structure according to the first aspect, wherein the rocker inner reinforcement is joined to the rocker inner panel at a vehicle width direction inner side to form a seventh closed cross-section portion positioned at a vehicle vertical direction upper side of the rocker inner reinforcement, and to form an eighth closed cross-section portion positioned at a vehicle vertical direction lower side of the rocker inner reinforcement.

In the vehicle lower section structure according to the twelfth aspect, the rocker inner reinforcement is joined to the rocker inner panel at the vehicle width direction inner side so as to provide the seventh closed cross-section portion positioned at the vehicle vertical direction upper side of the rocker inner reinforcement, and provide the eighth closed cross-section portion positioned at the vehicle vertical direction lower side of the rocker inner reinforcement. The present disclosure is thus capable of further increasing the rigidity of the rocker on the rocker inner panel side, and capable of further lessening shock input to the battery case joined to the rocker inner panel in a side-on collision of the vehicle.

The vehicle lower section structure according to the first aspect exhibits the effects of enabling shock input to the battery case in a side-on collision of the vehicle to be lessened, and enabling sufficient space in which to house a battery to be secured.

The vehicle lower section structure according to the second aspect exhibits the effects of enabling the rigidity of the rockers to be further raised, and enabling shock input to the battery case in a side-on collision of the vehicle to be further lessened.

The vehicle lower section structure according to the third aspect exhibits the effect of raising the vehicle vertical direction rigidity of the pillars, enabling roof crush to be suppressed.

The vehicle lower section structure according to the fourth aspect exhibits the effect of raising the vehicle vertical direction rigidity of the center pillars, enabling roof crush to be effectively suppressed.

The vehicle lower section structure according to the fifth aspect exhibits the effect of enabling roof crush to be suppressed by the rocker panels.

The vehicle lower section structure according to the sixth aspect exhibits the effect of enabling wiring to electrically connect battery modules housed within the battery case to be routed utilizing the refuge portion formed between the rocker inner panel and the battery case.

The vehicle lower section structure according to the seventh aspect exhibits the effect of enabling side collision load to be dispersed through the floor cross member, enabling side collision load input to the floor panel to be reduced.

The vehicle lower section structure according to the eighth aspect exhibits the effect of enabling battery space to be increased since there is no need to route wiring within the battery case.

The vehicle lower section structure according to ninth aspect exhibits the effect of enabling the vehicle width direction dimension of the floor panel to be shorter, enabling a commensurate reduction in costs.

The vehicle lower section structure according to the tenth aspect exhibits the effect of enabling a water-resistant function to be obtained at the join portion between the floor panel and the rocker by providing the seal at the corner positioned at the vehicle outer side.

The vehicle lower section structure according to the eleventh aspect exhibits the effect of enabling an operation to provide the seal to the corner to be performed even with limited space.

The vehicle lower section structure according to the twelfth aspect exhibits the effects of enabling rigidity of the rockers to be further raised, and enabling shock input to the battery case in a side-on collision of the vehicle to be further lessened.

BRIEF DESCRIPTION OF THE DRAWINGS

Exemplary embodiments of the present disclosure will be described in detail based on the following figures, wherein.

DETAILED DESCRIPTION

Explanation follows regarding a vehicle lower section structure according to the present disclosure, with reference to the drawings. Note that in the drawings, the arrow FR indicates a vehicle front side, the arrow UP indicates a vehicle upper side, and the arrow RH indicates a vehicle width direction right side, as appropriate. Hereafter, unless specifically specified otherwise, reference simply to front, rear, upward, downward, left, and right directions refers to the front and rear in a vehicle front-rear direction, upward and downward in a vehicle vertical direction, and left and right in a vehicle width direction when facing in a direction of travel.

Configuration of Vehicle Lower Section Structure

First, explanation follows regarding configuration of the vehicle lower section structure according to the present exemplary embodiment.

Figure 1:
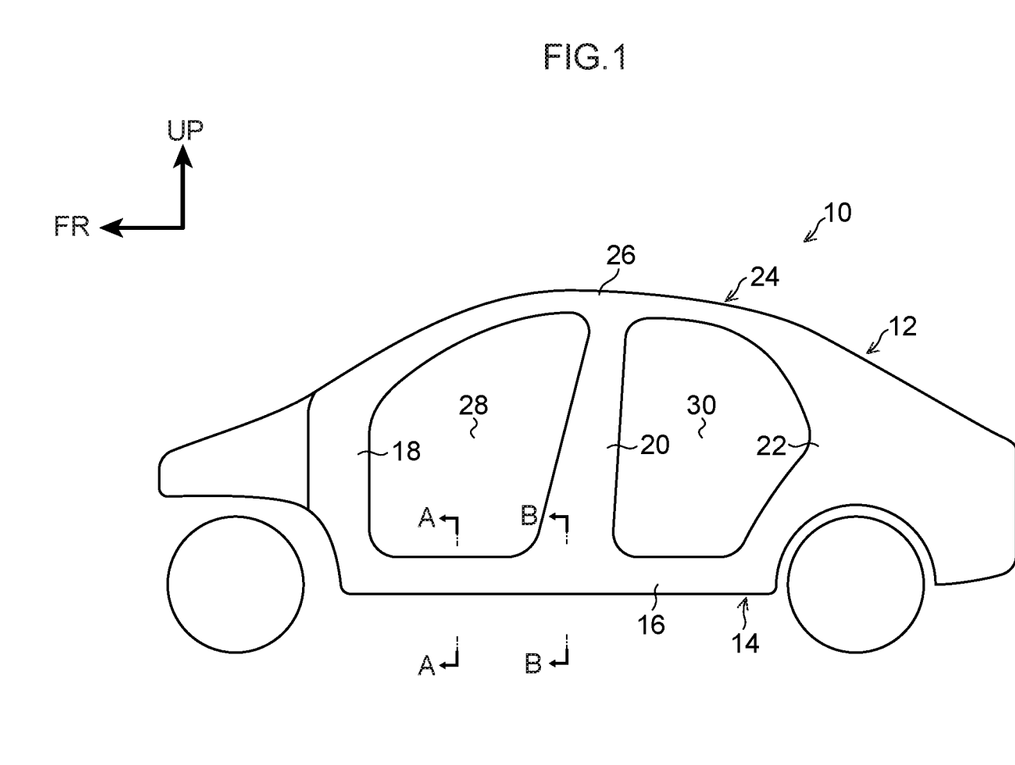
FIG. 1 is a schematic side view illustrating a vehicle applied with a vehicle lower section structure according to an exemplary embodiment of the present disclosure.

FIG. 1 is a schematic side view illustrating a vehicle 10 applied with a vehicle lower section structure. FIG. 1 illustrates what is referred to as a side member outer 12, and illustration of side doors and the like is omitted.

As illustrated in FIG. 1, the vehicle 10 includes rockers 16 that configure part of a vehicle body lower section 14 and extend in the vehicle front-rear direction. A front pillar 18, serving as an example of a pillar, extends toward the upper side from a front end portion of each of the rockers 16. A center pillar 20, serving as an example of a pillar, extends toward the upper side from a front-rear direction central portion of each of the rockers 16. A rear pillar 22, serving as an example of a pillar, extends toward the upper side from a rear end portion of each of the rockers 16. Upper end portions of each of the front pillars 18, the center pillars 20, and the rear pillars 22 are linked together by roof side rails 26 that configure part of a vehicle body upper section 24 and extend along the vehicle front-rear direction.

At a front portion side of each of the roof side rails 26, a substantially rectangular front side door opening 28 is formed by the roof side rail 26, the front pillar 18, the center pillar 20, and the rocker 16. The front side door opening 28 can be opened and closed by a front side door, not illustrated in the drawings.

At a rear portion side of each of the roof side rails 26, a substantially rectangular rear side door opening 30 is formed by the roof side rail 26, the center pillar 20, the rear pillar 22, and the rocker 16. Note that similarly to the front side door opening 28, the rear side door opening 30 can be opened and closed by a front side door, not illustrated in the drawings.

Figure 2:
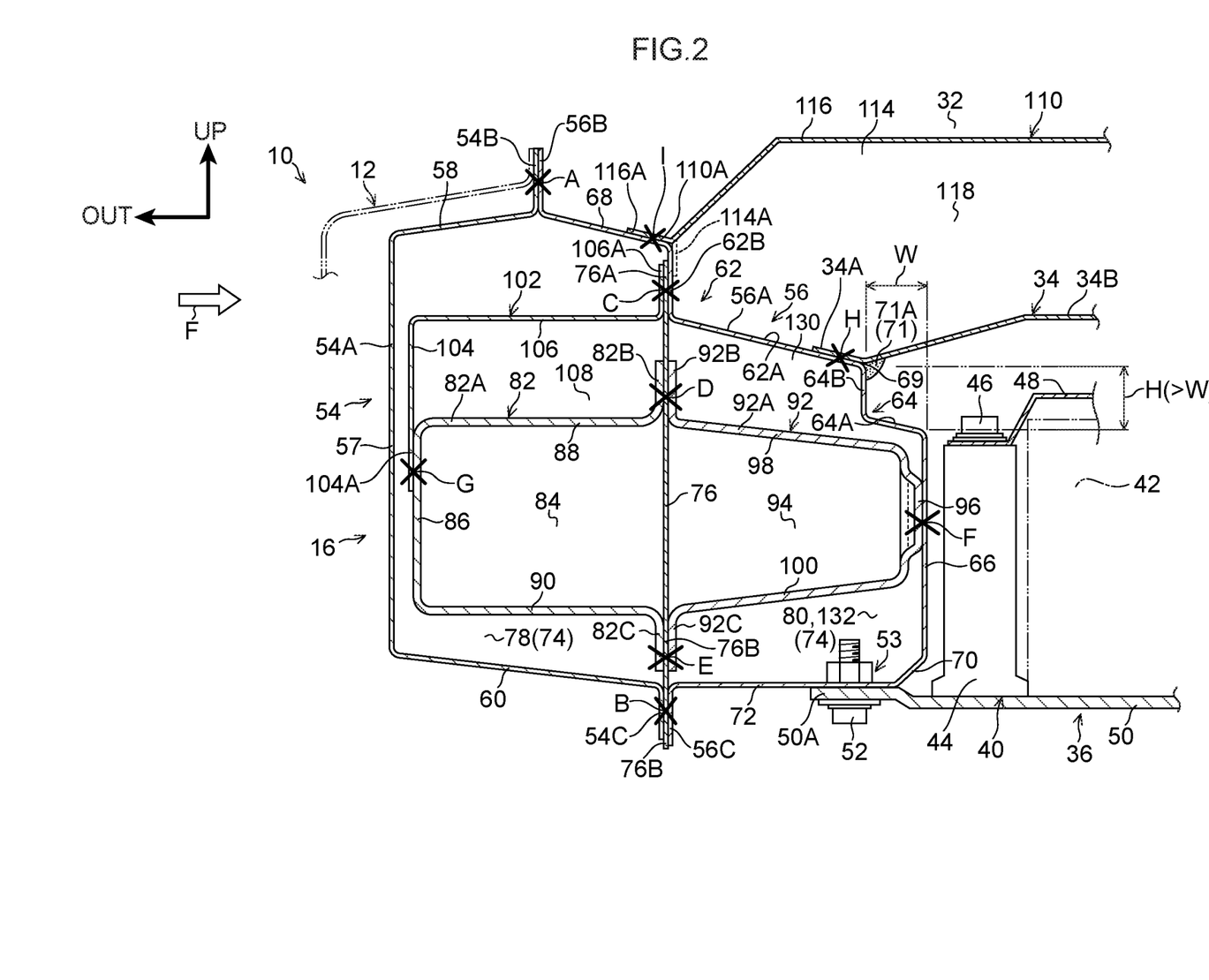
FIG. 2 is a cross-section sectioned along line A-A in FIG. 1.

A left and right pair of the rockers 16 are provided extending along the vehicle front-rear direction on both vehicle width direction outer sides of a floor panel 34 configuring a floor of a vehicle cabin 32, illustrated in FIG. 2. FIG. 2 illustrates a cross-section sectioned along line A-A in FIG. 1.

A battery pack 36 is installed between the pair of left and right rockers 16 at a lower side of the floor panel 34. The battery pack 36 serves as a drive force supply device to supply electrical power to a power unit such as a motor, and is configured by a storage battery employing lithium ion batteries, nickel-hydrogen batteries, or the like, or by a fuel cell employing hydrogen, methanol, or ethanol.

The battery pack 36 includes a battery case 40 formed in a box shape with its length direction extending in the vehicle front-rear direction and flattened in the vehicle vertical direction. Plural battery modules 42 configured by plural rectangular storage batteries, for example, are housed in the battery case 40. An outer peripheral portion of the battery case 40 is configured by a peripheral wall 44. A plate shaped top plate 48 is fixed to the peripheral wall 44 using plural bolts 46.

A bottom plate 50 formed with larger external dimensions than the peripheral wall 44 is fixed to the battery case 40. An outer edge portion 50A of the bottom plate 50 is fixed (fastened) to the corresponding rocker 16 using bolts 52 or the like (at a join portion 53). In this manner, the outer edge portion 50A of the bottom plate 50 is fixed to the rockers 16, and the battery pack 36 (battery case 40) is supported by the rockers 16 through the bottom plate 50.

Rockers

Explanation follows regarding the rockers 16.

As illustrated in FIG. 2, each of the rockers 16 is configured including a rocker outer panel (referred to hereafter as a "rocker outer") 54 positioned at the vehicle width direction outer side of the rocker 16, and a rocker inner panel (referred to hereafter as a "rocker inner") 56 positioned at the vehicle width direction inner side of the rocker 16.

As sectioned along the vehicle vertical direction and the vehicle width direction, the rocker outer 54 is formed with a substantially hat shaped cross-section profile opening toward the vehicle width direction inner side. A main body 54A of the rocker outer 54 includes a vertical wall 57 disposed at the vehicle width direction outer side and running in the vertical direction.

An upper inclined portion 58 inclined slightly toward the upper side on progression toward the vehicle width direction inner side is formed at an upper end of the vertical wall 57, and an upper flange 54B extending toward the upper side is formed at an inner end of the upper inclined portion 58, positioned at the vehicle width direction inner side of the upper inclined portion 58.

A lower inclined portion 60 inclined slightly toward the lower side on progression toward the vehicle width direction inner side is formed at a lower end of the vertical wall 57, and a lower flange 54C extending toward the lower side is formed at an inner end of the lower inclined portion 60 positioned at the vehicle width direction inner side of the lower inclined portion 60. The upper flange 54B is positioned further toward the vehicle width direction outer side than the lower flange 54C.

As sectioned along the vehicle vertical direction and the vehicle width direction, the rocker inner 56 is formed with a substantially hat shaped cross-section profile opening toward the vehicle width direction outer side. A main body 56A of the rocker inner 56 is formed with plural steps 62, 64. The main body 56A of the rocker inner 56 includes a vertical wall (second vertical wall) 66 disposed toward the vehicle width direction inner side and formed running in the vertical direction.

The vertical wall 66 is disposed so as to oppose the vertical wall 57 of the rocker outer 54, and also oppose the peripheral wall 44 of the battery pack 36. The step (refuge portion) 64 is provided at an upper side of the vertical wall 66 so as to be recessed from the vertical wall 66 toward the vehicle width direction outer side. The step 64 is configured including an inclined face 64A inclined slightly toward the upper side on progression toward the vehicle width direction outer side from an upper end of the vertical wall 66, and a back wall 64B extending from an end portion positioned at the vehicle width direction outer side of the inclined face 64A toward the upper side.

Figure 3:
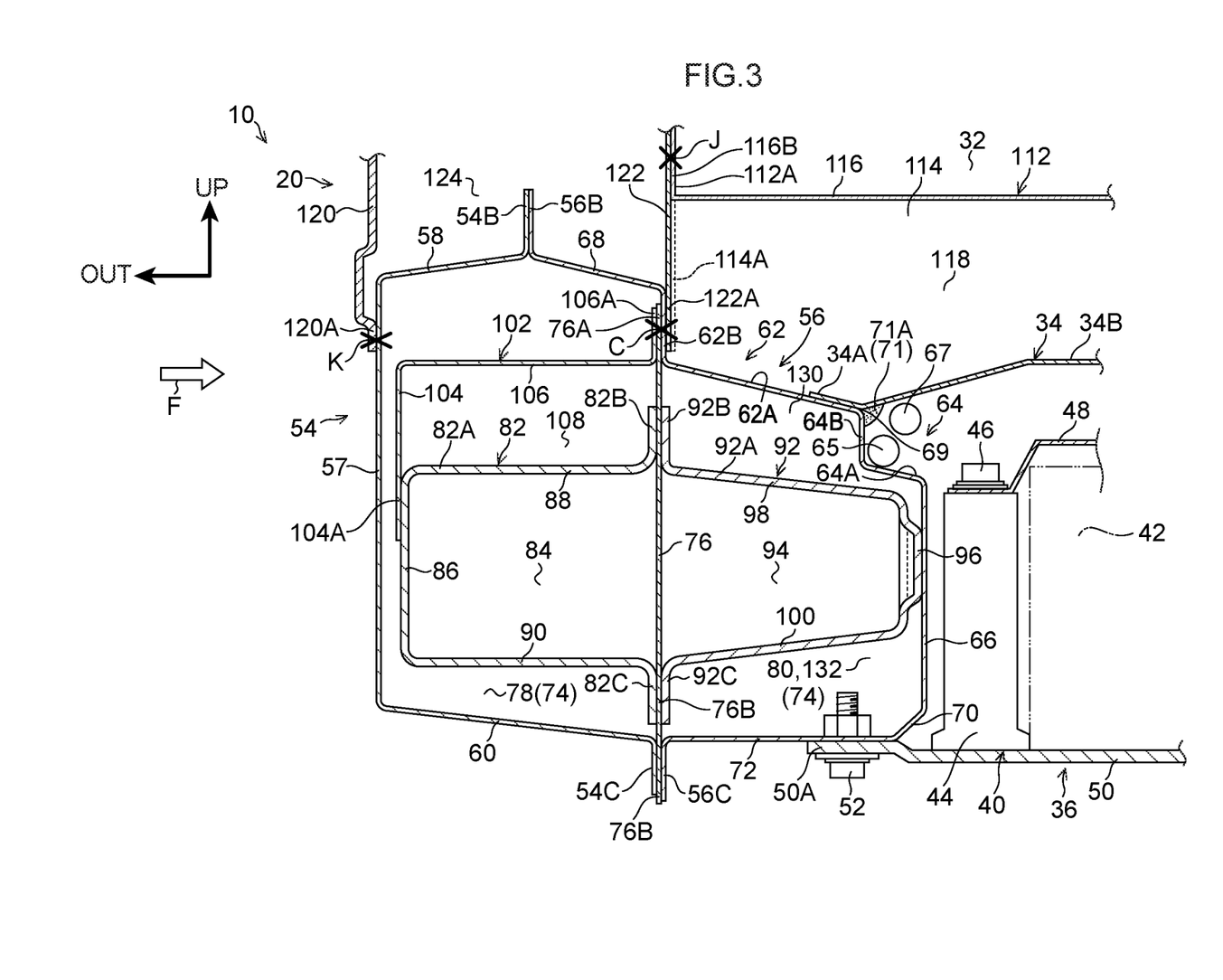
FIG. 3 is a cross-section sectioned along line B-B in FIG. 1.

A vehicle width direction width dimension (W) of the step 64 is shorter than a vehicle vertical direction height dimension (H) of the step 64 (H>W). As illustrated in FIG. 3, cables 65, 67 serving as an example of wiring such as wiring harnesses or the like to electrically connect the battery modules 42 housed inside the battery case 40, are routed through the step 64. Here, "wiring harnesses or the like" may include not only wiring harnesses but also information communication lines, optical fiber cables, infrared cables, and the like. In addition to the "wiring harnesses or the like" described above, other examples of "wiring" may include connectors, cable covers, junctions, relays, and the like. Note that FIG. 3 illustrates a cross-section sectioned along line B-B in FIG. 1. Moreover, a water-resistant seal 71 is provided at a corner 69 formed between the floor panel 34 and the step 64. In order to facilitate viewing of the drawing, the cables 65, 67 are omitted from illustration in FIG. 2.

As illustrated in FIG. 2, the step 62 is formed at an upper side of the step 64 so as to be recessed from the back wall 64B toward the vehicle width direction outer side. The step 62 is configured including an inclined face (join portion) 62A inclined slightly toward the upper side on progression toward the vehicle width direction outer side from an upper end of the back wall 64B, and a back wall (first vertical wall) 62B extending toward the upper side from an outer end of the inclined face 62A positioned at the vehicle width direction outer side of the inclined face 62A.

An upper inclined portion 68 inclined slightly toward the upper side on progression toward the vehicle width direction outer side is formed at an upper end of the back wall 62B. An upper flange 56B extending toward the upper side is formed at an outer end of the upper inclined portion 68 positioned at the vehicle width direction outer side of the upper inclined portion 68.

A beveled portion 70 inclined toward the lower side on progression toward the vehicle width direction outer side is provided at a lower side of the vertical wall 66. A lower wall portion 72 extending toward the vehicle width direction outer side is formed to the beveled portion 70. The outer edge portion 50A of the bottom plate 50, to which the battery case 40 is fixed, is fixed to the lower wall portion 72 (at the join portion 53). An outer end of the lower wall portion 72 positioned at the vehicle width direction outer side of the lower wall portion 72 is formed with a lower flange 56C extending toward the lower side.

In the present exemplary embodiment, the rocker outer 54 and the rocker inner 56 are, for example, formed from metal, such as sheet steel. As described above, an upper end portion and a lower end portion of the rocker outer 54 are respectively formed with the upper flange 54B and the lower flange 54C, and an upper end portion and a lower end portion of the rocker inner 56 are respectively formed with the upper flange 56B and the lower flange 56C.

The upper flange 54B of the rocker outer 54 and the upper flange 56B of the rocker inner 56 are joined together by welding or the like (at a join portion A). The lower flange 54C of the rocker outer 54 and the lower flange 56C of the rocker inner 56 are joined together by welding or the like (at a join portion B). The rocker outer 54 and the rocker inner 56 are thus integrated together to form a closed cross-section portion (first closed cross-section portion) 74 between the rocker outer 54 and the rocker inner 56.

In the following explanation, unless stated explicitly, joins between members employ welding, fastening, bonding, or the like. FIG. 3 omits illustration of some of the join portions in order to facilitate viewing of the drawing.

In the present exemplary embodiment, a rocker panel 76 running along the vertical direction of the rocker 16 is joined to the rocker outer 54 and the rocker inner 56. More specifically, the rocker panel 76 is formed in a plate shape, and an upper end portion 76A of the rocker panel 76 is joined to the back wall 62B of the rocker inner 56 (at a join portion C).

A lower end portion 76B of the rocker panel 76 is disposed between the lower flange 54C of the rocker outer 54 and the lower flange 56C of the rocker inner 56, and is joined to the lower flange 54C of the rocker outer 54 and the lower flange 56C of the rocker inner 56 at the join portion B described above.

The rocker panel 76 divides the closed cross-section portion 74 formed between the rocker outer 54 and the rocker inner 56 of the rocker 16 in the vehicle width direction. The rocker 16 is thus partitioned into a closed cross-section portion (second closed cross-section portion) 78 positioned toward the vehicle width direction outer side of the rocker 16, and a closed cross-section portion (third closed cross-section portion) 80 positioned toward the vehicle width direction inner side of the rocker 16.

Rocker outer reinforcement (referred to hereafter as "rocker outer R/F") 82 is disposed within the closed cross-section portion 78. The rocker outer R/F 82 forms a closed cross-section portion (fourth closed cross-section portion) 84 between itself and the rocker panel 76.

As sectioned along the vehicle vertical direction and the vehicle width direction, the rocker outer R/F 82 is formed with a substantially hat shaped cross-section profile opening toward the vehicle width direction inner side. A main body 82A of the rocker outer R/F 82 includes a vertical wall 86 disposed toward the vehicle width direction outer side and formed along the vertical direction so as to oppose the vertical wall 57 of the rocker outer 54.

An upper wall 88 is formed extending from an upper end of the vertical wall 86 toward the vehicle width direction inner side, and an upper flange 82B extending toward the upper side is formed at an inner end of the upper wall 88 positioned at the vehicle width direction inner side of the upper wall 88. The upper flange 82B is joined to the rocker panel 76 (at a join portion D).

A lower wall 90 is formed extending from a lower end of the vertical wall 86 toward the vehicle width direction inner side, and a lower flange 82C extending toward the lower side is formed to an inner end of the lower wall 90 positioned at the vehicle width direction inner side of the lower wall 90. The lower flange 82C is joined to the lower end portion 76B of the rocker panel 76 (at a join portion E). The closed cross-section portion 84 is thus formed between the rocker outer R/F 82 and the rocker panel 76.

Rocker inner reinforcement (referred to hereafter as "rocker inner R/F") 92 is disposed within the closed cross-section portion 80. The rocker inner R/F 92 forms a closed cross-section portion (fifth closed cross-section portion) 94 between itself and the rocker panel 76.

As sectioned along the vehicle vertical direction and the vehicle width direction, the rocker inner R/F 92 is formed with a substantially hat shaped cross-section profile opening toward the vehicle width direction outer side. A main body 92A of the rocker inner R/F 92 includes a vertical wall 96 disposed toward the vehicle width direction inner side and formed along the vertical direction, and that abuts and is joined to the vertical wall 66 of the rocker inner 56 through a join portion F. The third closed cross-section portion 80 is thus partitioned into a closed cross-section portion (seventh closed cross-section portion) 130 positioned at the vehicle vertical direction upper side of the rocker inner R/F 92, and a closed cross-section portion (eighth closed cross-section portion) 132 positioned at the vehicle vertical direction lower side of the rocker inner R/F 92.

An upper inclined portion 98 inclined slightly toward the upper side on progression toward the vehicle width direction outer side is formed at an upper end of the vertical wall 96, and an upper flange 92B extending toward the upper side is formed at an outer end of the upper inclined portion 98 positioned at the vehicle width direction outer side of the upper inclined portion 98. The upper flange 92B is joined to the rocker panel 76 together with the upper flange 82B of the rocker outer R/F 82 at the join portion D described above.

A lower inclined portion 100 inclined slightly toward the lower side on progression toward the vehicle width direction outer side is formed at a lower end of the vertical wall 96, and a lower flange 92C extending toward the lower side is formed at an outer end of the lower inclined portion 100 positioned at the vehicle width direction outer side of the lower inclined portion 100. The lower flange 92C is joined to the rocker panel 76 together with the lower flange 82C of the rocker outer R/F 82 at the join portion E described above. The closed cross-section portion 94 is thus formed between the rocker inner R/F 92 and the rocker panel 76.

Upper reinforcement (referred to hereafter as "upper R/F") 102 is provided at the upper side of the rocker outer R/F 82 within the closed cross-section portion 78 positioned toward the vehicle width direction outer side of the rocker 16. The cross-section profile of the upper R/F 102 is formed substantially in an inverted L-shape as sectioned along the vehicle vertical direction and the vehicle width direction.

The upper R/F 102 includes a vertical wall 104 that is formed along the vertical direction toward the vehicle width direction outer side of the upper R/F 102, and that opposes the vertical wall 57 of the rocker outer 54. A lower end portion 104A of the vertical wall 104 is joined to the vertical wall 86 of the rocker outer R/F 82 (at a join portion G).

An upper wall 106 extending toward the vehicle width direction inner side is formed at an upper end of the vertical wall 104. An upper flange 106A extending toward the upper side is formed at an inner end of the upper wall 106 positioned at the vehicle width direction inner side of the upper wall 106. The upper flange 106A is joined to the back wall 62B of the rocker inner 56 together with the upper end portion 76A of the rocker panel 76 at the join portion C described above. A closed cross-section portion (sixth closed cross-section portion) 108 is thus formed between the rocker outer R/F 82 and the rocker panel 76.

As described above, the rockers 16 are provided at the two vehicle width direction outer sides of the floor panel 34. More specifically, vehicle width direction outer edge portions 34A of the floor panel 34 are joined to the respective inclined faces 62A configuring parts of the steps 62 formed to the rocker inners 56 of the respective rockers 16 (at a join portion H).

Plural floor cross members 110, 112 (see FIG. 3) that span between the pair of left and right rockers 16 in the vehicle width direction are arranged in the vehicle front-rear direction over an upper face 34B of the floor panel 34. Note that as illustrated in FIG. 1 and FIG. 2, the floor cross member 110 is provided at a location that does not overlap any pillar, including the front pillars 18 and the rear pillars 22, in side view of the vehicle. As illustrated in FIG. 1 and FIG. 3, the floor cross member 112 is provided so as to overlap the center pillar 20 in side view of the vehicle.

As described later and illustrated in FIG. 2, both vehicle width direction end portions 110A of the floor cross member 110 are joined to the corresponding rocker inner 56 (at a join portion I), and as illustrated in FIG. 3, both vehicle width direction end portions 112A of the floor cross member 112 are joined to the corresponding center pillar 20 (at a join portion J).

Floor Cross Members

More specific explanation follows regarding the floor cross members 110, 112.

The floor cross member 110 illustrated in FIG. 2 and the floor cross member 112 illustrated in FIG. 3 have the same basic configuration as each other. Accordingly, explanation is given regarding the basic configuration of the floor cross member 110 as a representative of the two floor cross members, and the same reference numerals are used for equivalent parts of the floor cross member 110 and the floor cross member 112.

As sectioned along the vehicle vertical direction and the vehicle front-rear direction, the floor cross member 110 illustrated in FIG. 2 is formed with a hat shaped cross-section profile opening toward the floor panel 34. The floor cross member 110 illustrated in FIG. 2 includes a non-illustrated front wall positioned at a front side of the floor cross member 110, and a rear wall 114 positioned at a rear side of the floor cross member 110 and disposed opposing the front wall.

The front wall and the rear wall 114 are linked by an upper wall 116. A front flange is formed extending toward the front side from a lower end of the front wall, and a rear flange is formed extending toward the rear side from a lower end of the rear wall 114. The front flange and the rear flange are each joined to the upper face 34B of the floor panel 34 to form a closed cross-section portion 118 between the floor cross member 110 and the floor panel 34.

In the floor cross member 110 that is provided at a location that does not overlap any pillar in side view of the vehicle, at both vehicle width direction end portions 110A of the floor cross member 110 an upper flange 116A is formed extending obliquely toward the upper side from a vehicle width direction side end of the upper wall 116 of the floor cross member 110. Each of the upper flanges 116A is joined to the upper inclined portion 68 of the corresponding rocker inner 56 (at the join portion I).

Although not illustrated in the drawings, the vehicle width direction side ends of the front wall are formed with a front flange bending toward the front side at each vehicle width direction end portion 110A of the floor cross member 110. The vehicle width direction side ends of the rear wall 114 are also formed with a rear flange 114A bending toward the rear side at each vehicle width direction end portion 110A of the floor cross member 110.

The front flanges and the rear flanges 114A are each joined to the back wall 62B provided to the step 62 of the corresponding rocker inner 56 (at the join portion C). Note that at each of the join portions C, the upper end portion 76A of the rocker panel 76 and the upper flange 106A of the rocker outer R/F 82 are joined to the back wall 62B of the corresponding rocker inner 56. In consideration of joint strength, there is no need to join each of the members, including the front flange and the rear flange 114A of the floor cross member 110, at the same position at the join portions C. Namely, some members are joined in an offset state in the vehicle front-rear direction.

As illustrated in FIG. 3, the floor cross member 112 that overlaps the center pillar 20 in side view of the vehicle is formed with an upper flange 116B extending toward the upper side at both vehicle width direction end portions 112A of the floor cross member 112 at vehicle width direction side ends of the upper wall 116. Each of the upper flanges 116B is joined to the corresponding center pillar 20 (at the join portion J).

Note that each of the center pillars 20 is configured including a pillar outer panel (referred to hereafter as "pillar outer") 120 positioned toward the vehicle width direction outer side, and a pillar inner panel (referred to hereafter as "pillar inner") 122 serving as a pillar inner member positioned toward the vehicle width direction inner side. The pillar outer 120 and the pillar inner 122 form a closed cross-section portion 124.

A lower end portion 120A of the pillar outer 120 is joined to the vertical wall 57 of the corresponding rocker outer 54 (at a join portion K), and a lower end portion 122A of the pillar inner 122 is joined to the back wall 62B provided to the step 62 of the corresponding rocker inner 56 (at the join portion C). Note that at the join portions C, as described above, the upper end portion 76A of the rocker panel 76 and the upper flange 106A of the rocker outer R/F 82 are joined to the back wall 62B of the rocker inner 56. In consideration of joint strength, there is no need to join each of the members, including the lower end portion 122A of the pillar inner 122, at the same position at the join portions C. Namely, some members are joined in an offset state in the vehicle front-rear direction.

Although not illustrated in the drawings, similarly to in the floor cross member 110, the vehicle width direction side ends of the front wall are formed with a front flange bending toward the front side at each vehicle width direction end portion 112A of the floor cross member 112. The vehicle width direction side ends of the rear wall 114 are also formed with a rear flange 114A bending toward the rear side at each vehicle width direction end portion 112A of the floor cross member 112.

The front flanges and the rear flanges 114A are each joined to the back wall 62B provided to the step 62 of the corresponding rocker inner 56 (at the join portion C). Note that at each of the join portions C, the lower end portion 122A of the pillar inner 122 described above, the upper end portion 76A of the rocker panel 76, and the upper flange 106A of the rocker outer R/F 82 are joined to the back wall 62B of the corresponding rocker inner 56.

Operation and Effects of Vehicle Lower Section Structure

Explanation follows regarding operation and effects of the vehicle lower section structure according to the present exemplary embodiment.

As illustrated in FIG. 2, in the present exemplary embodiment, each of the rockers 16 is configured including the rocker outer 54 and the rocker inner 56. A vehicle width direction outer side of the rocker 16 is configured by the rocker outer 54, and a vehicle width direction inner side of the rocker 16 is configured by the rocker inner 56. The closed cross-section portion 74 is formed by the rocker outer 54 and the rocker inner 56, and the battery case 40 is joined (fastened) to the rocker inner 56 (at the join portion 53).

In this manner, the battery case 40 is joined to the rocker inners 56 forming the vehicle width direction inner side of the rockers 16 in the present exemplary embodiment. Although not illustrated in the drawings, this enables the battery case 40 to be made larger in the vehicle width direction than, for example, in a case in which the battery case 40 is joined so as to be separated toward the vehicle width direction inner side from each of the rockers 16.

In the present exemplary embodiment, each of the rockers 16 is configured further including the rocker panel 76, the rocker outer R/F 82, and the rocker inner R/F 92. The rocker panel 76 is joined to the rocker outer 54 and the rocker inner 56 (at the join portion B and the join portion C). The closed cross-section portion 74 of the rocker 16 is partitioned into the closed cross-section portion 78 positioned toward the vehicle width direction outer side of the rocker 16 and the closed cross-section portion 80 positioned toward the vehicle width direction inner side of the rocker 16 by the rocker panel 76.

Accordingly, in the present exemplary embodiment each of the rockers 16 is provided with the rocker panel 76 that partitions the closed cross-section portion 74 formed by the rocker outer 54 and the rocker inner 56 in the vehicle width direction. The rocker panel 76 is thus braced in the vehicle vertical direction within the rocker 16, thereby acting as a member with a bracing function. The rocker panel 76 of the present exemplary embodiment therefore suppresses vehicle vertical direction crushing (what is referred to as cross-sectional collapse) of the rocker 16.

Moreover, in the present exemplary embodiment, the rocker outer R/F 82 is disposed within the closed cross-section portion 78 partitioned by the rocker panel 76, and the rocker outer R/F 82 forms the closed cross-section portion 84 between itself and the rocker panel 76. The rocker inner R/F 92 is disposed within the closed cross-section portion 80 partitioned by the rocker panel 76, and the rocker inner R/F 92 forms the closed cross-section portion 94 between itself and the rocker panel 76 and is also joined to the rocker outer R/F 82 (at the join portion D and the join portion E).

Accordingly, in the present exemplary embodiment, the rigidity of the rockers 16 can be raised by providing each of the rockers 16 with the rocker outer RI/F 82 and the rocker inner R/F 92 that respectively form the closed cross-section portion 84 and the closed cross-section portion 94 between themselves and the rocker panel 76. Accordingly, in the present exemplary embodiment, in a side-on collision of the vehicle 10, shock input to the battery case 40 that is joined to the rocker inners 56 can be lessened, particularly in a localized side-on collision in which a colliding body such as a pole collides with the rocker 16 from the vehicle width direction outer side.

Namely, the present exemplary embodiment is capable of lessening shock input to the battery case 40 in a side-on collision of the vehicle 10, and also capable of securing sufficient space in which to house the battery modules 42.

Moreover, in the present exemplary embodiment, the upper R/F 102 is provided further toward the vehicle vertical direction upper side than the rocker outer R/F 82 within the closed cross-section portion 78 of the rocker 16. The upper R/F 102 forms the closed cross-section portion 108 between the rocker outer R/F 82 and the rocker panel 76. Accordingly, in the present exemplary embodiment, the rigidity of the rockers 16 can be further raised on the rocker outer 54 side, enabling shock input to the battery case 40 that is joined to the rocker inners 56 be further lessened in a side-on collision of the vehicle 10.

Moreover, as illustrated in FIG. 3, in the present exemplary embodiment the rocker panel 76 is joined to the pillar inner 122 configuring the vehicle width direction inner side of the center pillar 20 provided at the vehicle front-rear direction central portion of each of the rockers 16. As described above, the rocker panel 76 acts as a member with a bracing function due to being braced in the vehicle vertical direction within the rocker 16, thereby suppressing vehicle vertical direction crushing of the rockers 16. Accordingly, in the present exemplary embodiment, the vehicle vertical direction rigidity of the center pillar 20 is raised, enabling crushing of a ceiling of the vehicle 10 in a rollover accident of the vehicle 10, namely what is referred to as roof crush, to be effectively suppressed.

Accordingly, the rocker panel 76 is disposed at the lower side of at least the center pillar 20. Of course, there is no limitation to the center pillar 20, and the rocker panels 76 may also be provided at the lower side of the front pillar 18 and the rear pillar 22 illustrated in FIG. 1 respectively. The rocker panel 76 may also be provided spanning the entire rocker 16 in the vehicle front-rear direction.

Moreover, as illustrated in FIG. 2, in the present exemplary embodiment the rocker inner R/F 92 is joined to the rocker inner 56 at the vehicle width direction inner side so as to form the seventh closed cross-section portion 130 positioned at the vehicle vertical direction upper side of the rocker inner R/F 92, and the eighth closed cross-section portion 132 positioned at the vehicle vertical direction lower side of the rocker inner R/F 92. This enables the rigidity of the rockers 16 to be raised. Accordingly, the present exemplary embodiment enables shock input to the battery case 40 that is joined to the rocker inner 56 to be further lessened in a side-on collision of the vehicle 10, particularly in a localized side-on collision in which a colliding body such as a pole collides with the rocker 16 from the vehicle width direction outer side.

Namely, the present exemplary embodiment is capable of lessening shock input to the battery case 40 in a side-on collision of the vehicle 10, and also capable of securing sufficient space in which to house the battery modules 42.

Moreover, as illustrated in FIG. 2, the rocker inner 56 of the present exemplary embodiment is configured including the vertical wall 66 and the step 64. The vertical wall 66 is provided further toward the vehicle width direction inner side than the back wall 62B of the step 62 provided at the upper side of the step 64, and opposes the battery case 40. The step 64 is provided between the vertical wall 66 and the back wall 62B, and the step 64 is formed recessed toward the vehicle width direction outer side.

Namely, in the present exemplary embodiment, a space can be formed as a refuge portion between the rocker inner 56 and the battery case 40 by providing the step 64 to the rocker inner 56. The cables 65, 67 that electrically connect the battery modules 42 housed in the battery case 40 can thus be routed through the step 64.

By routing the cables 65, 67 through the step 64 in this manner, there is no need to secure a space to route the cables 65, 67 within the battery case 40, enabling maximum utilization of the space within the battery case 40. The present exemplary embodiment thus enables the size of the battery case 40 to be increased. Note that the step 64 is not an absolute requirement. In cases in which the step 64 is not formed to the rocker inner 56, the cables 65, 67 are routed at a location other than the step 64.

In the present exemplary embodiment, as illustrated in FIG. 2 and FIG. 3, the floor cross members 110, 112 are installed along the vehicle width direction above the floor panel 34. The vehicle width direction end portions 110A of the floor cross member 110 and the vehicle width direction end portions 112A of the floor cross member 112 are respectively joined to the back walls 62B, and the upper flange 106A at the vehicle width direction inner end portion of the upper R/F 102 is also joined to the back wall 62B. Namely, in the present exemplary embodiment, the upper R/F 102 and the floor cross members 110, 112 are provided so as to run continuously along the vehicle width direction through the back walls 62B of the respective rocker inners 56.

Accordingly, in the present exemplary embodiment, in a side-on collision of the vehicle 10, side collision load F input to one of the rockers 16 is transmitted to the opposite rocker 16 through the upper R/F 102 and the floor cross members 110, 112. Namely, in the present exemplary embodiment, the side collision load F is dispersed through the floor cross members 110, 112, enabling transmitted load transmitted to the floor panel 34 to be reduced.

Moreover, in the present exemplary embodiment, the join portions H where the vehicle width direction outer edge portions 34A of the floor panel 34 are joined are provided between the back wall 62B of the step 62 and the back wall 64B of the step 64 of the respective rocker inners 56 of the rockers 16. Namely, in the present exemplary embodiment, the join portion H of the floor panel 34 is provided further toward the vehicle width direction inner side than the back wall 62B of the rocker inner 56.

Accordingly, in the present exemplary embodiment, the floor panel 34 can be configured with a shorter vehicle width direction dimension in the floor panel 34 than in cases in which the join portion H is provided to the back wall 62B on the step 62 side of the rocker inner 56, enabling a commensurate reduction in costs. Note that the outer edge portions 34A of the floor panel 34 may, of course, be joined to the back walls 62B of the respective rocker inners 56.

Moreover, in the present exemplary embodiment, the seal 71 is provided to the corner 69 formed between the floor panel 34 and the step 64. Namely, in the present exemplary embodiment, providing the seal 71 at the corner 69 positioned on the vehicle outer side obtains a water-resistant function at the join portion H between the floor panel 34 and the rocker inner 56.

Note that the seal 71 is formed by coating with a sealing member 71A. Although not illustrated in the drawings, a tool is needed to coat the sealing member 71A onto the corner 69. This tool enters the refuge portion from the lower side of the corner 69. In the present exemplary embodiment, the vehicle width direction dimension (W) of the step 64 is accordingly shorter than the vehicle vertical direction height dimension (H) of the step 64 (H>W).

Accordingly, the angle of entry of the tool is smaller than 45°. If the angle of entry of the tool becomes large, the tool is inserted into the step 64 in a state commensurately closer to horizontal, requiring a wider operation space to be secured. However, in the present exemplary embodiment, the angle of entry of the tool can be smaller than 450, and the seal 71 is provided to the corner 69 formed between the floor panel 34 and the step 64 in a state in which in which the tool is as close as possible to vertical. The present exemplary embodiment thus enables an operation to provide the seal 71 to the corner 69 to be performed even with limited space.

Supplementary Explanation of the Present Exemplary Embodiment

Although the rocker outer 54 and the rocker inner 56 illustrated in FIG. 2 are formed from sheet steel in the present exemplary embodiment, they may be formed from another metal, such as an aluminum alloy. Note that in such cases, the rockers 16 are formed by extrusion, drawing, or the like, and the rocker outer 54 and the rocker inner 56 do not necessarily need to be configured by separate members.

Moreover, in the present exemplary embodiment, there is no particular limitation to the sheet thicknesses of the rocker outer 54, the rocker inner 56, and other members that configure the rocker 16. The sheet thicknesses of the respective members may be modified, and a single member may have different sheet thicknesses at different locations.

Moreover, although the upper R/F 102 is provided within the rocker 16 in the present exemplary embodiment, the upper R/F 102 is not an absolute requirement.

Moreover, in the present exemplary embodiment the front flange and the rear flange 114A are joined to the back walls 62B provided to the steps 62 of the respective rocker inners 56 through the join portions C at both vehicle width direction end portions 110A of the floor cross member 110, as illustrated in FIG. 2. Although the upper end portion 76A of the rocker panel 76 and the upper flange 106A of the rocker outer R/F 82 are joined to the back wall 62B of the rocker inner 56 at each of the join portions C, there is no need for each of these members to be joined at the same position.

Regarding the center pillar 20, the lower end portion 122A of the pillar inner 122 is joined to the back wall 62B provided to the step 62 of the corresponding rocker inner 56 through the join portion C. As described above, although the upper end portion 76A of the rocker panel 76 and the upper flange 106A of the rocker outer R/F 82 are joined to the back wall 62B of the corresponding rocker inner 56 at the join portion C, there is no need for each of these members to be joined at the same position.

Although explanation has been given regarding an exemplary embodiment of the present disclosure, the present disclosure is not limited to the above present exemplary embodiment, and the exemplary embodiment may obviously be combined with various modified examples as appropriate to implement various configurations within a range not departing from the spirit of the present disclosure.

What is claimed is:

1. A vehicle lower section structure, comprising:
    a pair of rockers, which are respectively installed at opposing outer sides, in a vehicle width direction, of a floor panel of a vehicle, and that each extend in a vehicle front-rear direction; and
    a battery case that is disposed between the pair of rockers at a lower side, in a vehicle vertical direction, of the floor panel,
    each of the rockers including:
        a rocker outer panel configuring a vehicle width direction outer side of the rocker,
        a rocker inner panel configuring a vehicle width direction inner side of the rocker, forming a first closed cross-section portion with the rocker outer panel, and joined to the battery case,
        a rocker panel joined to the rocker outer panel and the rocker inner panel so as to partition the first closed cross-section portion between a second closed cross-section portion positioned toward the vehicle width direction outer side of the rocker and a third closed cross-section portion positioned toward the vehicle width direction inner side of the rocker,
        a rocker outer reinforcement disposed within the second closed cross-section portion to form a fourth closed cross-section portion between the rocker outer reinforcement and the rocker panel,
        a rocker inner reinforcement disposed within the third closed cross-section portion to form a fifth closed cross-section portion between the rocker inner reinforcement and the rocker panel, and joined to the rocker outer reinforcement, and
        an upper reinforcement disposed within the second closed cross-section portion and further toward a vehicle vertical direction upper side than the rocker outer reinforcement so as to form a sixth closed cross-section portion between the rocker outer reinforcement and the rocker panel.

2. The vehicle lower section structure of claim 1, further comprising a pillar that extends from each of the rockers toward the vehicle vertical direction upper side,
    wherein a vehicle width direction inner side of each of the pillars is configured by a pillar inner member that is joined to the corresponding rocker panel.

3. The vehicle lower section structure of claim 2, wherein:
    each of the pillars is a center pillar that is provided at a vehicle front-rear direction central portion of the corresponding rocker;
    each of the rocker inner panels includes a first vertical wall formed along the vehicle vertical direction and the vehicle front-rear direction; and
    a vehicle vertical direction lower end portion of the pillar inner member of each of the center pillars is joined to the corresponding first vertical wall in the vehicle width direction.

4. The vehicle lower section structure of claim 3, wherein a vehicle vertical direction upper end portion of each of the rocker panels is joined to the corresponding first vertical wall in the vehicle width direction.

5. The vehicle lower section structure of claim 3, each of the rocker inner panels further comprising:
- a second vertical wall provided further toward a vehicle width direction inner side than the first vertical wall so as to oppose the battery case; and
- a refuge portion formed between the second vertical wall and the first vertical wall so as to be recessed toward a vehicle width direction outer side.

6. The vehicle lower section structure of claim 3, wherein:
- a floor cross member is installed along the vehicle width direction above the floor panel of the vehicle; and
- a vehicle width direction end portion of the floor cross member is joined to the corresponding first vertical wall, and a vehicle width direction inner end portion of the upper reinforcement is also joined to the first vertical wall.

7. The vehicle lower section structure of claim 5, wherein wiring is routed through the refuge portion.

8. The vehicle lower section structure of claim 5, wherein a join portion, to which a vehicle width direction end portion of the floor panel is joined, is provided between the first vertical wall and the refuge portion.

9. The vehicle lower section structure of claim 8, wherein a seal is provided at a corner formed between the floor panel and the refuge portion.

10. The vehicle lower section structure of claim 9, wherein a vehicle width direction dimension of the refuge portion is shorter than a vehicle vertical direction height dimension of the refuge portion.

11. A vehicle lower section structure, comprising:
- a pair of rockers, which are respectively installed at opposing outer sides, in a vehicle width direction, of a floor panel of a vehicle, and that each extend in a vehicle front-rear direction; and
- a battery case that is disposed between the pair of rockers at a lower side, in a vehicle vertical direction, of the floor panel,
- each of the rockers including:
    - a rocker outer panel configuring a vehicle width direction outer side of the rocker,
    - a rocker inner panel configuring a vehicle width direction inner side of the rocker, forming a first closed cross-section portion with the rocker outer panel, and joined to the battery case,
    - a rocker panel joined to the rocker outer panel and the rocker inner panel so as to partition the first closed cross-section portion between a second closed cross-section portion positioned toward the vehicle width direction outer side of the rocker and a third closed cross-section portion positioned toward the vehicle width direction inner side of the rocker,
    - a rocker outer reinforcement disposed within the second closed cross-section portion to form a fourth closed cross-section portion between the rocker outer reinforcement and the rocker panel, and
    - a rocker inner reinforcement disposed within the third closed cross-section portion to form a fifth closed cross-section portion between the rocker inner reinforcement and the rocker panel, and joined to the rocker outer reinforcement, the rocker inner reinforcement is joined to the rocker inner panel at a vehicle width direction inner side to form a seventh closed cross-section portion positioned at a vehicle vertical direction upper side of the rocker inner reinforcement, and to form an eighth closed cross-section portion positioned at a vehicle vertical direction lower side of the rocker inner reinforcement.

12. The vehicle lower section structure of claim 11, wherein each of the rockers is further provided with an upper reinforcement, within the second closed cross-section portion and further toward a vehicle vertical direction upper side than the rocker outer reinforcement, so as to form a sixth closed cross-section portion between the rocker outer reinforcement and the rocker panel.

13. The vehicle lower section structure of claim 12, further comprising a pillar that extends from each of the rockers toward a vehicle vertical direction upper side,
- wherein a vehicle width direction inner side of each of the pillars is configured by a pillar inner member that is joined to the corresponding rocker panel.

14. The vehicle lower section structure of claim 13, wherein:
- each of the pillars is a center pillar that is provided at a vehicle front-rear direction central portion of the corresponding rocker;
- each of the rocker inner panels includes a first vertical wall formed along the vehicle vertical direction and the vehicle front-rear direction; and
- a vehicle vertical direction lower end portion of the pillar inner member of each of the center pillars is joined to the corresponding first vertical wall in the vehicle width direction.

15. The vehicle lower section structure of claim 14, wherein a vehicle vertical direction upper end portion of each of the rocker panels is joined to the corresponding first vertical wall in the vehicle width direction.

16. The vehicle lower section structure of claim 14, each of the rocker inner panels further comprising:
- a second vertical wall provided further toward a vehicle width direction inner side than the first vertical wall so as to oppose the battery case; and
- a refuge portion formed between the second vertical wall and the first vertical wall so as to be recessed toward a vehicle width direction outer side.

17. The vehicle lower section structure of claim 14, wherein:
- a floor cross member is installed along the vehicle width direction above the floor panel of the vehicle; and
- a vehicle width direction end portion of the floor cross member is joined to the corresponding first vertical wall, and a vehicle width direction inner end portion of the upper reinforcement is also joined to the first vertical wall.

18. The vehicle lower section structure of claim 16, wherein wiring is routed through the refuge portion.

19. The vehicle lower section structure of claim 16, wherein a join portion, to which a vehicle width direction end portion of the floor panel is joined, is provided between the first vertical wall and the refuge portion.

20. The vehicle lower section structure of claim 19, wherein a seal is provided at a corner formed between the floor panel and the refuge portion.

* * * * *